(12) United States Patent
Sander et al.

(10) Patent No.: US 11,962,609 B2
(45) Date of Patent: Apr. 16, 2024

(54) SOURCE ENTITIES OF SECURITY INDICATORS

(71) Applicant: ENTIT SOFTWARE LLC, Sanford, NC (US)

(72) Inventors: Tomas Sander, Princeton, NJ (US); Brian Frederik Hosea Che Hein, Aliso Viejo, CA (US); Nadav Cohen, Sunnyvale, CA (US); Ted Ross, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 687 days.

(21) Appl. No.: 16/076,274

(22) PCT Filed: Feb. 12, 2016

(86) PCT No.: PCT/US2016/017862
§ 371 (c)(1),
(2) Date: Aug. 7, 2018

(87) PCT Pub. No.: WO2017/138961
PCT Pub. Date: Aug. 17, 2017

(65) Prior Publication Data
US 2020/0351292 A1 Nov. 5, 2020

(51) Int. Cl.
*H04L 29/00* (2006.01)
*H04L 9/40* (2022.01)

(52) U.S. Cl.
CPC ...... *H04L 63/1433* (2013.01); *H04L 63/1408* (2013.01); *H04L 63/20* (2013.01)

(58) Field of Classification Search
CPC . H04L 63/1433; H04L 63/20; H04L 63/1408; H04L 29/06904; G06F 21/577
See application file for complete search history.

(56) References Cited

U.S. PATENT DOCUMENTS 7,886,334 B1 * 2/2011 Walsh ............... H04L 67/14
726/1
8,832,832 B1 * 9/2014 Visbal ............... H04L 63/1408
726/22

(Continued)

FOREIGN PATENT DOCUMENTS

KR 10-1505079 B1 3/2015
WO WO-2012164336 12/2012
WO WO-2014145431 9/2014

OTHER PUBLICATIONS

"McAfee GTI Reputation & Categorization Services", Retrieved from Internet Jul. 21, 2015, <http://www.mcafee.com/in/threat-center/technology/gti-reputation-technologies.aspx>.

(Continued)

*Primary Examiner* — Jeffrey C Pwu
*Assistant Examiner* — Helai Salehi
(74) *Attorney, Agent, or Firm* — Sheridan Ross P.C.

(57) ABSTRACT

Examples disclosed herein relate to source entities of security indicators. Some examples disclosed herein enable identifying, in a security information sharing platform, a security indicator that is originated from a source entity where the security indicator comprises an observable. Some examples further enable determining a reliability level of the source entity based on at least one of: security events, sightings of the observable, a first set of user feedback information that is submitted for the security indicator by users of the security information sharing platform, or a second set of user feedback information that is collected from external resources that are external to the security information sharing platform.

20 Claims, 5 Drawing Sheets

(56) References Cited

U.S. PATENT DOCUMENTS

| | | |
|---|---|---|
| 8,881,281 B1 | 11/2014 | Mitchell |
| 8,949,978 B1 | 2/2015 | Lin |
| 9,118,714 B1* | 8/2015 | Thomson ............... G06T 11/206 |
| 11,303,662 B2* | 4/2022 | Bachner .................. H04L 63/14 |
| 2005/0160286 A1 | 7/2005 | Currie et al. |
| 2013/0074159 A1 | 3/2013 | Lin et al. |
| 2014/0053226 A1* | 2/2014 | Fadida .................... H04L 67/34 |
| | | 726/1 |
| 2014/0282977 A1 | 9/2014 | Madhu et al. |
| 2014/0289853 A1 | 9/2014 | Teddy |
| 2015/0121449 A1 | 4/2015 | Cp |
| 2015/0326614 A1* | 11/2015 | Alperovitch .......... H04L 63/104 |
| | | 726/1 |

OTHER PUBLICATIONS

International Searching Authority, International Search Report and Written Opinion dated Nov. 2, 2016 for PCT Application No. PCT/US2016/017862 Filed Feb. 12, 2016, 13 pages.

Yu. S., et al., Attributed-Based on-Demand Multicase Group Setup with Membership Anonymity, SecureComm 2008, Sep. 22-25, 2008, 6 pages.

\* cited by examiner

SOURCE ENTITIES OF SECURITY INDICATORS

BACKGROUND

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users.

BRIEF DESCRIPTION THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. A security indicator may be created by and/or originated from at least one of a plurality of source entities. For example, the plurality of source entities may include a user (e.g., analysts and/or community members of the security information sharing platform). A security indicator may be manually created and/or added to the security information sharing platform by the user. In another example, the plurality of source entities may include a threat intelligence provider that provides threat intelligence feeds and/or any other participating organizations. A security indicator that is found in the intelligence feeds and/or information from other participating organizations, for example, may be automatically created and/or added to the security information sharing platform.

Since security indicators can be easily created and/or added by various source entities using the security information sharing platform, there may be a risk that a certain security indicator is erroneously classified as malicious that poses an actual security threat. For example, if a popular news site that is actually benign and not malicious is included as an observable in a security indicator, the site can be blocked, causing inconvenience to the users and/or communities. Moreover, this may cause erroneous security alerts to be generated, contaminating the data being shared and continuously being re-shared in the security information sharing environment.

Examples disclosed herein provide technical solutions to these technical challenges by determining a reliability level and/or an authenticity level of a source entity of a particular security indicator to help determine an indicator score associated the particular security indicator. Accurate indicator scores help prioritize among a large amount of data maintained by the security information sharing platform to enable an informed and timely decision on threat mitigation. Source reliability and/or authenticity are important ingredients for computing accurate indicator scores. For example, threat intelligence from an organization with a track record for skilled and competent analysis can be trusted more than threat intelligence from another organization with a low reputation.

Some examples disclosed herein enable identifying, in a security information sharing platform, a security indicator that is originated from a source entity where the security indicator comprises an observable. Some examples further enable determining a reliability level of the source entity based on at least one of: security events, sightings of the observable, a first set of user feedback information that is submitted for the security indicator by users of the security information sharing platform, or a second set of user feedback information that is collected from external resources that are external to the security information sharing platform.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
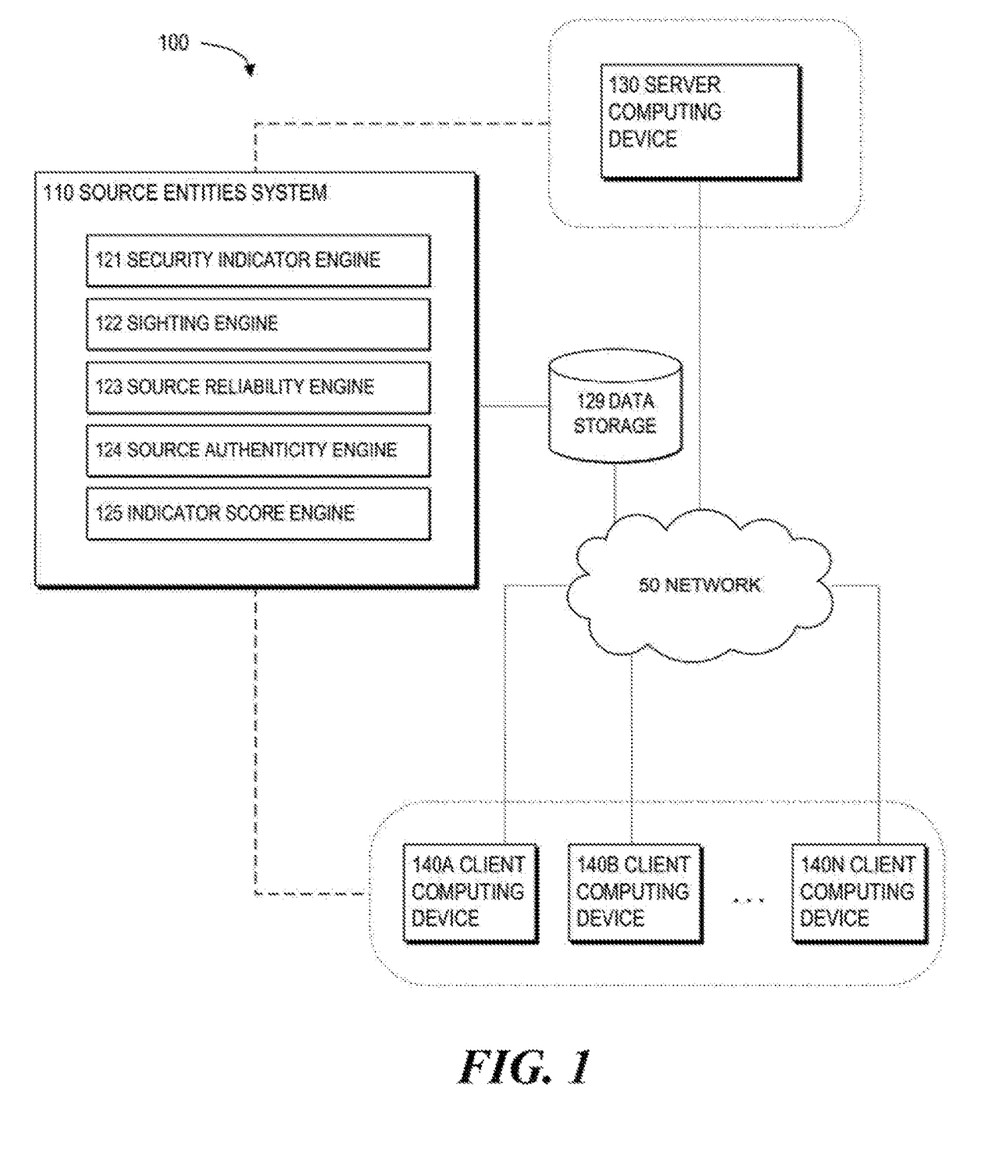
FIG. 1 is a block diagram depicting an example environment in which various examples may be implemented as a source entities system.

FIG. 1 is an example environment 100 in which various examples may be implemented as a source entities system 110. Environment 100 may include various components including server computing device 130 and client computing devices 140 (illustrated as 140A, 140B, . . . , 140N). Each client computing device 140A, 140B, . . . , 140N may communicate requests to and/for receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, source entities system 110 and the various components described herein may be implemented in hardware and/or a combination of hardware and programming that configures hardware. Furthermore, in FIG. 1 and other Figures described herein, different numbers of components or entities than depicted may be used.

Source entities system 110 may comprise a security indicator engine 121, a sighting engine 122, a source reliability engine 123, a source authenticity engine 124, an indicator score engine 125, and/or other engines. The term "engine" as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Security indicator engine 121 may identify a security indicator that is originated from a source entity. The security indicator may comprise at least one observable. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entitles. For example, the plurality of source entities may include a user (e.g., analysts and/or community members of the security information sharing platform). A security indicator may be manually created and/or added to the security information sharing platform by the user. In another example, the plurality of source entities may include a threat intelligence provider that provides threat intelligence feeds and/or any other participating organizations. A security indicator that is found in the intelligence feeds and/or information from other participating organizations, for example, may be automatically created and/or added to the security information sharing platform. There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria. In another example, the plurality of source entities may include a third-party researcher or analyst.

In another example, a source entity may include an external resource (e.g., that is external to the security information sharing platform) such as web resources (e.g., a web forum, Internal Relay Chat (IRC) channel, social media, a publisher of articles). In this case, note that a source entity may be an individual creator/author of the content that is exchanged via these web resources (e.g., an author of a message posted on the message forum, an author of a social media post, an author of an article, etc.). On the other hand, a source entity may represent the external resource itself that supplies or otherwise provides the content is created by individual creators/authors.

In some implementations, the security information sharing platform may obtain and/or store (e.g., in a data storage 129) information related to the security indicator. Examples of the information related to the security indicator may include but are not limited to: an indicator score associated with the security indicator (e.g., as discussed herein with respect to indicator score engine 125), information related to a source entity of the indicator (e.g., identification of the source entity, level of source reliability associated with the source entity as discussed herein with respect to source reliability engine 125, level of source authenticity associated with the source entity as discussed herein with respect to source authenticity engine 124, etc.), a level of severity (e.g., the level of severity that the indicator may pose) associated with the security indicator (e.g., as discussed herein with respect to security indicator engine 121), and information related to an observable in the security indicator (e.g., information related to a source entity that provided the observable, sightings of the observable as discussed herein with respect to sighting engine 122, etc.), a threat actor for the security indicator (e.g., attacker behind the threat indicated in the security indicator), a domain name, a timestamp, a campaign, a technique/tactic/procedure (TTP), and a group that the security indicator belongs to (e.g., an organization, an industry sector, a community of the security information sharing platform, etc.).

Sighting engine 122 may obtain, from a source entity, a sighting of an observable. The sighting of the observable may indicate that the observable has been observed by the source entity. For example, the source entity (e.g., the examples of the source entity are discussed herein with respect to security indicator engine 121) may detect a certain IP address (e.g., the observable) in its network traffic, and add the observable to the security information sharing platform. This addition of the observable may be considered as a single sighting of the observable. In some instances, when two individuals working for the same organization add the same observable to the platform, sighting engine 122 may treat these additions as a single sighting of the observable or as two separate sightings of the observable. In another example, when the IP address (e.g., the observable) is found in the threat intelligence feeds provided by a particular threat intelligence provider, this observable may be added to the security information sharing platform as a single sighting of this observable. When two different set of threat intelligence feeds provided by two different providers include the same observable, the observable may be added as two sightings of the observable.

Sighting engine 122 may determine a number (e.g., count) of sightings of the observable. For example, sighting engine 122 may obtain, from a first source entity, a first sighting of the observable that indicates that the observable has been observed by the first source entity. Sighting engine 122 may obtain, from a second source entity, a second sighting of the observable that indicates that the observable has been observed by the second source entity. In this case, the number of sightings of this observable may be 2. Note that the same observable may be associated with more than one security indicator. For example, a certain IP address may be part of a first security indicator (e.g., a finding of this IP address indicates a Trojan virus) as well as a second security indicator (e.g., a finding of this IP address visiting a particular URL indicates a Trojan virus). As such, a single sighting of the observable may be counted as one sighting for each of the first security indicator and the second security indicator. Therefore, a single sighting of the observable associated with more than one security indicator can influence the respective indicator scores associated with those security indicators. In some implementations, sighting engine 122 may determine a normalized value of the number of sightings using a normalization algorithm. Any normalization algorithm known in the art may be used to determine the normalized value.

Source reliability engine 123 may identify and/or determine a reliability level of a particular source entity based on various parameters including, but not being limited to: (1) security events, (2) sightings of the observable, (3) a set of user feedback information that is submitted for the security indicator by users of the security information sharing platform, (4) a set of user feedback information and/or other information that is collected from external resources that are external to the security information sharing platform, and (5) a default or hard-coded reliability level. Each of the above parameters for determining the source reliability level is discussed in detail below.

(1) Security events: A "security event," as used herein, may include at least one security indicator and/or observable that are related to the same security event, and/or other information that may be relevant to that event (e.g., information related to a security indicator, user comments, etc.). For example, a user may create a new security event in the security information sharing platform after noticing an unusual activity in the network. The user and/or other users that are authorized to access the security event may create and/or submit a security indicator to the security event. The user and/or other users that are authorized to access the security event may identify a security indicator that has been provided by another source entity to include it in the security event. If a large number of security events include security indicators or other data items (e.g., threat actor, industry sector, etc.) that originate from a particular source entity, this could mean that the particular source entity has a track record of providing reliable information. As such, source reliability engine 123 may determine the reliability level of the particular source entity based on the number of security events that include security indicators and/or other data items that originated from that particular source entity.

(2) Sightings of the observable: The sightings of the observable may be used to determine the reliability level of the source entity that provided the observable and/or security indicator having that observable. For example, based on the number of sightings of the observable (e.g., that may be determined as discussed herein with respect to sighting engine 122), the source reliability may be increased or decreased. In some cases, a high number of sightings may indicate that the source entity provided accurate information to the platform, resulting in a higher source reliability for the source entity. In other cases, a high number of sightings of inaccurate information (e.g., a popular website that is benign) may result in a lower source reliability for the source entity.

(3) A set of user feedback information that is submitted for the security indicator by users of the security information sharing platform: Users of the security information sharing platform may provide user feedback on a particular security indicator (and/or on a particular source entity, in some instances). The user feedback may include a comment, a rating, a vote, a selection from a list of options, etc. For example, a vote may indicate whether the security indicator is accurate. Source reliability engine 123 may obtain a set of votes associated with the particular security indicator from the users of the platform, and/or determine a reliability level of a source entity from which the particular security indicator originated based on the set of votes (e.g., the number of positive, neutral, and/or negative votes made to the security indicator).

(4) A set of user feedback information and/or other information that is collected from external resources that are external to the security information sharing platform: In some situations, a set of user feedback information may be collected from any of the external resources. In one example, source reliability engine 123 may evaluate statements and/or comments from the external resources (e.g., a web forum, social media, IRC channel, publisher, etc.) regarding the utility of the source-entity provided information (e.g., security indicators provided by a particular source entity) in resolving their security incidents or how helpful they found the provided information to be for detection purposes. Positive comments regarding the source entity and/or the source-entity provided information may, for example, positively influence the reliability level of that source entity. In another example, a survey may be provided to external entities to collect a set of user feedback information on a particular security indicator and/or a particular source entity. Source reliability engine 123 may periodically collect the user feedback information from the external resources.

In some implementations, source reliability engine 123 may determine a reliability level of a particular source entity based on a comparison between (3) the set of user feedback information that is submitted for the security indicator (e.g., that originated from the particular source entity) by users of the security information sharing platform and (4) the set of user feedback information that is collected from the external resources regarding the security indicator. For example, if the result of the comparison indicates a discrepancy above a certain threshold value, the reliability level for the particular source entity should be lowered. On the other hand, if the result of the comparison indicates a similarity above a certain threshold, the reliability level for the source entity could be increased.

In some implementations, an external resource could represent a source entity itself, and source reliability engine 123 may determine a reliability level of the external resource as a source entity. For example, there may be an external resource that publishes or otherwise provides various articles. The various articles may be written by different individual authors. If an article contains content (e.g., content about a threat actor) that is related to a security indicator in the platform, that external resource may be given a higher reliability level.

(5) A default or hard-coded reliability level: A default reliability level may be set by a user and/or by system 110. A default reliability level may be set for an individual source entity and/or a group of source entities. If the reliability level for a particular source entity is unknown or otherwise cannot be determined, the default reliability level may be used for the particular source entity. In some instances, the reliability level may be hard-coded, meaning the hard-coded reliability level would overwrite the reliability level that is determined based on other parameters described above.

Source authenticity engine 124 may determine an authenticity level of a particular source entity based on a type of the source entity. The type of the source entity may comprise a non-trusted source type or a trusted source type. For example, a source entity such as a government entity (e.g., Federal Bureau of Investigation (FBI)) may be given a high authenticity level whereas an email or a social media message from a non-trusted or non-verified source should be given a low authenticity level. Generally, threat intelligence feed providers that have been verified are given a high authenticity level. External resources, in particular web resources as discussed above, may be given a low authenticity level because they usually apply a low level of scrutiny to the content therein.

Indicator score engine 125 may determine an indicator score associated with the security indicator (e.g., that originated from a particular source entity) based on various parameters including, but not being limited to: a severity level associated with the security indicator, the reliability level of the particular source entity (e.g., as discussed herein with respect to source reliability engine 123), and the authenticity level of the particular source entity (e.g., as discussed herein with respect to source authenticity engine 124). In some implementations, each of the parameters may be scaled by a corresponding weight. The weight may represent the weight or influence the particular parameter has on the indicator score. For example, the weight value may be any value from 0 to 100. The total sum of all weights of the parameters being used to determine the indicator score can be 100 in some situations, but is not necessarily 100.

In some implementations, a recommendation and/or a recommended action may be generated or otherwise provided based on the indicator score (e.g., as discussed herein with respect to indicator score engine 125) of the security indicator. For example, if the indicator score is below a first threshold value, the indicator can be continued to be monitored without any further action. If the indicator score is above the first threshold value but below a second threshold value, the recommendation may be generated to inform at least one user to perform a further investigation on the security indicator. If the indicator score is above a third threshold value, the indicator may be considered to be malicious and/or accurate that could pose an actual security threat. In this case, any event that matches this security indicator may be blocked from accessing certain resources.

In performing their respective functions, engines 121-125 may access data storage 129 and/or other suitable database(s). Data storage 129 may represent any memory accessible to source entities system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Source entities system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
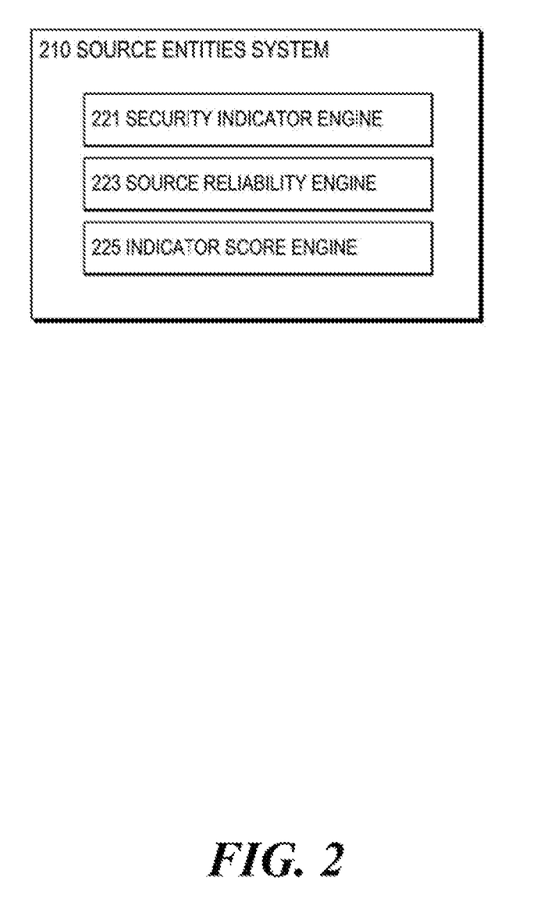
FIG. 2 is a block diagram depicting an example source entities system.

FIG. 2 is a block diagram depicting an example source entities system 210. Source entities system 210 may comprise a security indicator engine 221, a source reliability engine 223, an indicator score engine 225, and/or other engines. Engines 221, 223, and 225 represent engines 121, 123, and 125, respectively.

Figure 3:
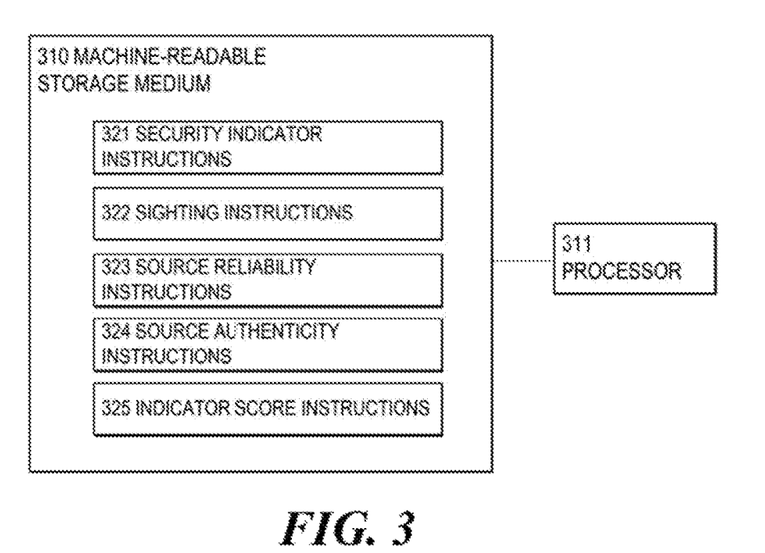
FIG. 3 is a block diagram depicting an example machine-readable storage medium comprising instructions executable by a processor for source entities of security indicators.

FIG. 3 is a block diagram depicting an example machine-readable storage medium 310 comprising instructions executable by a processor for source entities of security indicators.

In the foregoing discussion, engines 121-125 were described as combinations of hardware and programming. Engines 121-125 may be implemented in a number of fashions. Referring to FIG. 3, the programming may be processor executable instructions 321-325 stored on a machine-readable storage medium 310 and the hardware may include a processor 311 for executing those instructions. Thus, machine-readable storage medium 310 can be said to store program instructions or code that when executed by processor 311 implements source entities system 110 of FIG. 1.

In FIG. 3, the executable program instructions in machine-readable storage medium 310 are depicted as security indicator instructions 321, sighting instructions 322, source reliability instructions 323, source authenticity instructions 324, indicator score instructions 325. Instructions 321-325 represent program instructions that, when executed, cause processor 311 to implement engines 121-125, respectively.

Figure 4:
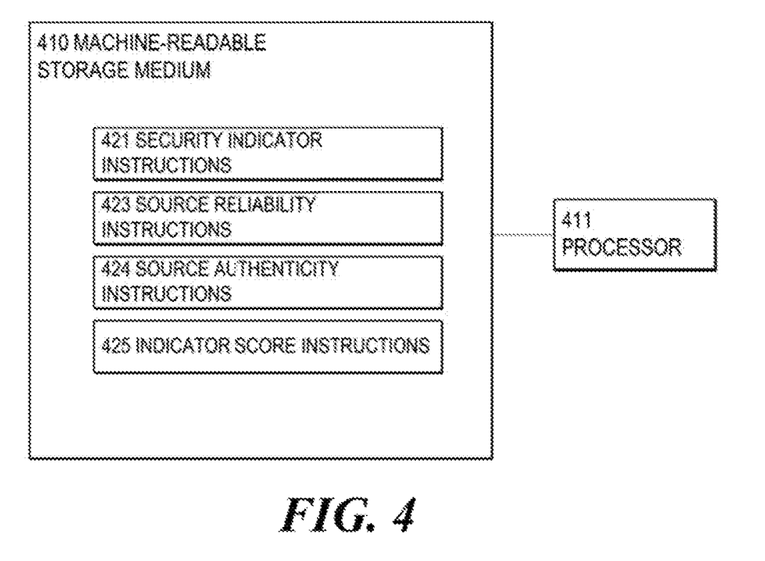
FIG. 4 is a block diagram depicting an example machine-readable storage medium comprising instructions executable by a processor for source entities of security indicators.

FIG. 4 is a block diagram depicting an example machine-readable storage medium 410 comprising instructions executable by a processor for source entities of security indicators.

In the foregoing discussion, engines 121-125 were described as combinations of hardware and programming. Engines 121-125 may be implemented in a number of fashions. Referring to FIG. 4, the programming may be processor executable instructions 421 and 423-425 stored on a machine-readable storage medium 410 and the hardware may include a processor 411 for executing those instructions. Thus, machine-readable storage medium 410 can be said to store program instructions or code that when executed by processor 411 implements source entities system 110 of FIG. 1.

In FIG. 4, the executable program instructions in machine-readable storage medium 410 are depicted as security indicator instructions 421, source reliability instructions 423, source authenticity instructions 424, and indicator score instructions 425. Instructions 421 and 423-425 represent program instructions that, when executed, cause processor 411 to implement engines 121 and 123-125, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement source entities system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-325, and/or other instructions. As an alternative or in addition to retrieving and executing instructions, processor 311 may include at least one electronic circuit comprising a number of electronic components for performing the functionality of at least one of instructions 321-325, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421 and 423-425, and/or other instructions. As an alternative or in addition to retrieving and executing instructions, processor 411 may include at least one electronic circuit comprising a number of electronic components for performing the functionality of at least one of instructions 421 and 423-425, and/or other instructions.

Figure 5:
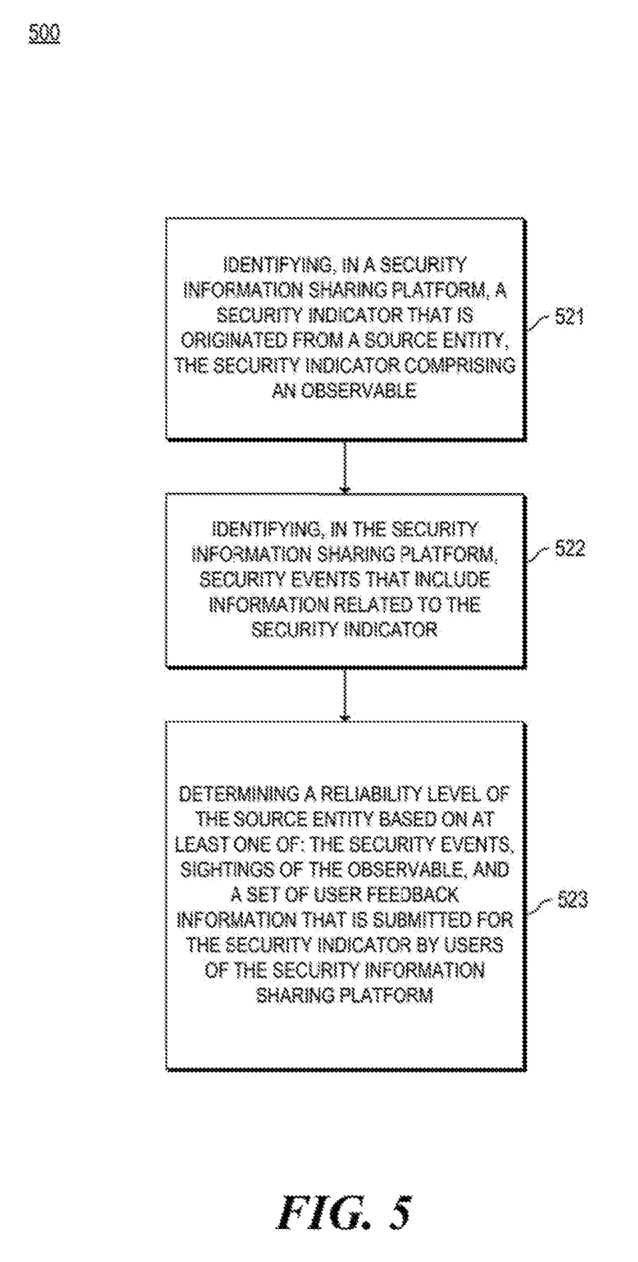
FIG. 5 is a flow diagram depicting an example method for determining reliability levels of source entities of security indicators.

FIG. 5 is a flow diagram depicting an example method 500 for determining reliability levels of source entities of security indicators. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include identifying, in a security information sharing platform, a security indicator that is originated from a source entity, the security indicator comprising an observable. Referring back to FIG. 1, security indicator engine 121 may be responsible for implementing block 521.

In block 522, method 500 may include identifying, in the security information sharing platform, security events that include information related to the security indicator. Referring back to FIG. 1, source reliability engine 123 may be responsible for implementing block 522.

In block 523, method 500 may include determining a reliability level of the source entity based on at least one of: the security events, sightings of the observable, or a set of user feedback information that is submitted for the security indicator by users of the security information sharing platform. Referring back to FIG. 1, source reliability engine 123 may be responsible for implementing block 523.

Figure 6:
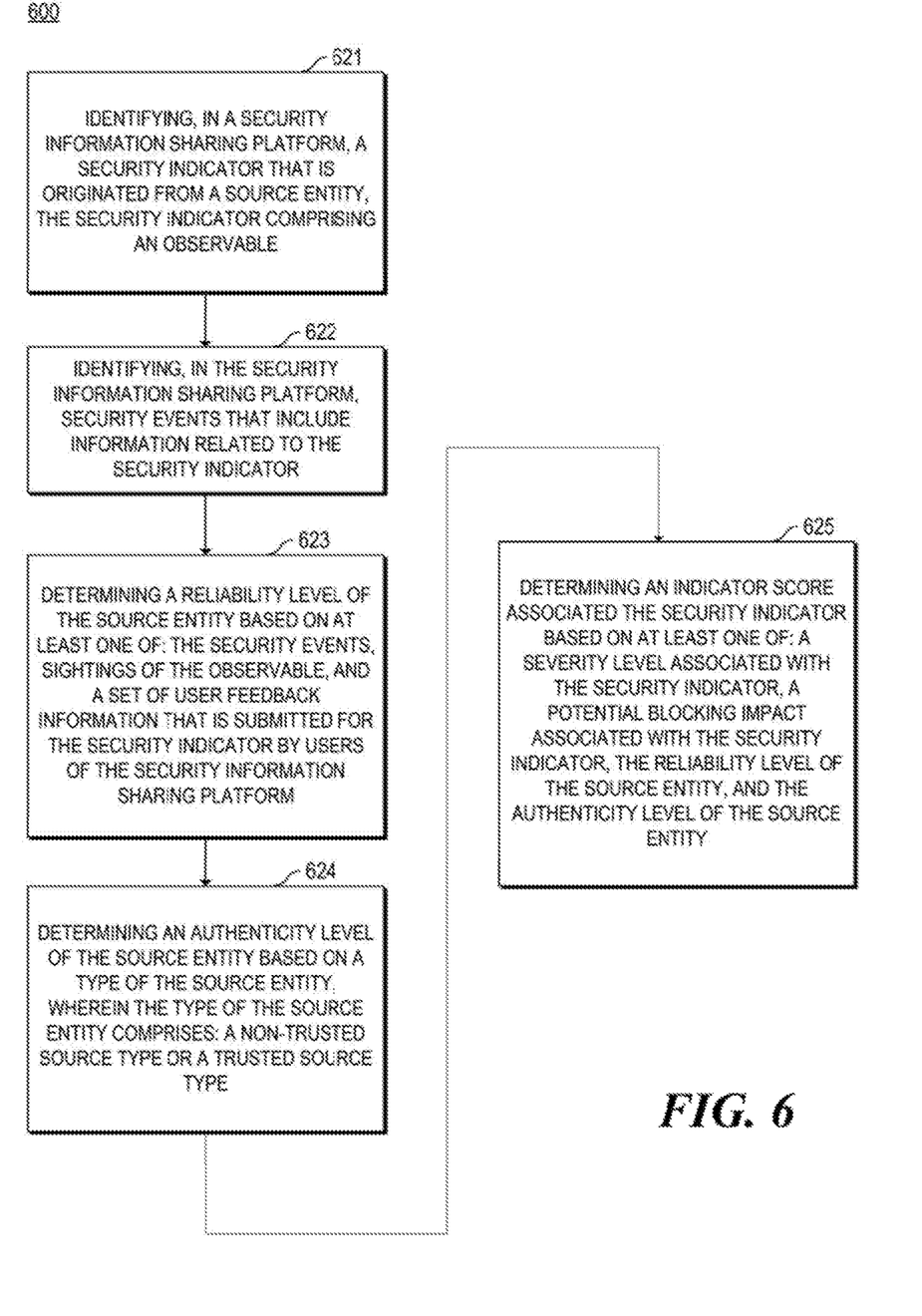
FIG. 6 is a flow diagram depicting an example method for determining reliability and authenticity levels of source entities of security indicators.

FIG. 6 is a flow diagram depicting an example method 600 for determining reliability and authenticity levels of source entities of security indicators. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include identifying, in a security information sharing platform, a security indicator that is originated from a source entity, the security indicator comprising an observable. Referring back to FIG. 1, security indicator engine 121 may be responsible for implementing block 621.

In block 622, method 600 may include identifying, in the security information sharing platform, security events that include information related to the security indicator. Referring back to FIG. 1, source reliability engine 123 may be responsible for implementing block 622.

In block 623, method 600 may include determining a reliability level of the source entity based on at least one of: the security events, sightings of the observable, or a set of user feedback information that is submitted for the security indicator by users of the security information sharing platform. Referring back to FIG. 1, source reliability engine 123 may be responsible for implementing block 623.

In block 624, method 600 may include determining an authenticity level of the source entity based on a type of the source entity, wherein the type of the source entity comprises: a non-trusted source type or a trusted source type. Referring back to FIG. 1, source authenticity engine 124 may be responsible for implementing block 624.

In block 625, method 600 may include determining an indicator score associated the security indicator based on at least one of: a severity level associated with the security indicator, the reliability level of the source entity, or the authenticity level of the source entity. Referring back to FIG. 1, indicator score engine 125 may be responsible for implementing block 625.

The foregoing disclosure describes a number of example implementations for source entities of security indicators. The disclosed examples may include systems, devices, computer-readable storage media, and methods for determining reliability and/or authenticity levels of source entities of security indicators. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
   identifying, by a processor, a security indicator that is originated from a first source entity of a plurality of source entities in a security information sharing platform, wherein the security indicator provides a warning of a potential security threat and specifies a particular address or domain name of the potential security threat;
   determining, by the processor, a total count of sightings of the particular address or domain name of the potential security threat as observed by the plurality of source entities in the security information sharing platform;
   determining a reliability level of the first source entity based on a set of user feedback information including votes about accuracy of the security indicator and the total count of sightings of the particular address or domain name of the potential security threat, wherein a higher number of votes about the accuracy of the security indicator and a higher count of sightings of the particular address or domain name of the potential security threat result in a higher reliability level of the first source entity;
   determining a score of the security indicator based on the reliability level of the first source entity; and
   comparing the score of the security indicator to at least one threshold value to determine whether the security indicator is an actual security threat.

2. The method of claim 1, further comprising:
   determining an authenticity level of the first source entity based on a type of the first source entity, wherein the type of the first source entity comprises: a non-trusted source type or a trusted source type.

3. The method of claim 1, wherein the set of user feedback information about the security indicator further includes information provided by an external resource that is external to the security information sharing platform.

4. The method of claim 1, further comprising:
   providing a survey to collect the set of user feedback information about the security indicator from users of the security information sharing platform.

5. The method of claim 1, further comprising:
   obtaining an article via a second source entity;
   determining whether the article includes information related to the security indicator; and
   determining a reliability level of the second source entity based on the determination of whether the article includes the information related to of the security indicator.

6. The method of claim 1, wherein comparing the score of the security indicator to the at least one threshold value includes:
   comparing the score of the security indicator to a first threshold value and a second threshold value;
   in response to a determination that the score of the security indicator is below the first threshold value, continuing monitoring the security indicator;
   in response to a determination that the score of the security indicator is above the first threshold value hut below the second threshold value, generating a recommendation to perform a further investigation on the security indicator; and in response to a determination that the score of the security indicator is above the second threshold value, determining that the security indicator is the actual security threat.

7. The method of claim 2, wherein determining the score of the security indicator is further based on the authenticity level of the first source entity.

8. The method of claim 5, wherein the information related to the security indicator comprises at least one of: a threat actor, a campaign, a technique/tactic/procedure (TTP), an organization, an industry sector, or a community.

9. The method of claim 6, further comprising:
in response to the determination that the security indicator is the actual security threat, blocking any event that matches the security indicator.

10. A non-transitory machine-readable storage medium storing instructions executable by a processor of a computing device to cause the processor to:
identify a first security indicator that is originated from a first source entity of a plurality of source entities in a security information sharing platform, wherein the first security indicator provides a warning of a first potential security threat and specifies a first address or domain name of the first potential security threat;
determine a total count of sightings of the first address or domain mane of the first potential security threat as observed by the plurality of source entities in the security information sharing platform;
determine a reliability level of the first source entity based on a first set of user feedback information including votes about accuracy of the first security indicator and the total count of sightings of the first address or domain name of the first potential security threat, wherein a higher number of votes about the accuracy of the first security indicator and a higher count of sightings of the first address or domain name of the first potential security threat result in a higher reliability level of the first source entity;
determine a score of the first security indicator based on the reliability level of the first source entity; and
compare the score of the first security indicator to at least one threshold value to determine whether the first security indicator is an actual security threat.

11. The non-transitory machine-readable storage medium of claim 10, wherein the instructions are executable to cause the processor to:
identify a second security indicator that is originated from a second source entity of the plurality of source entities in the security information sharing platform, the second security indicator comprising a second address or domain name of a second potential security threat;
determine a reliability level of the second source entity based on a total count of sightings of the second address or domain name of the second potential security threat as observed by the plurality of source entities in the security information sharing platform;
determine an authenticity level of the second source entity based on a type of the second source entity; and
determine an indicator score of the second security indicator based on the reliability level of the second source entity and the authenticity level of the second source entity.

12. The non-transitory machine-readable storage medium of claim 10, wherein the instructions are executable to cause the processor to:
determine a number of security events that are created in the security information sharing platform, wherein the security events include the first security indicator; and
determine the reliability level of the first source entity based on the number of security events, the first set of user feedback information about the first security indicator, and the total count of sightings of the first address or domain name of the first potential security threat.

13. The non-transitory machine-readable storage medium of claim 10, wherein the instructions that cause the processor to determine the total count of sightings of the first address or domain name include instructions that cause the processor to:
obtain, from a second source entity, a first sighting of the first address or domain name, the first sighting of the first address or domain name indicating that the first address or domain name has been observed by the second source entity;
obtain, from a third source entity, a second sighting of the first address or domain name, the second sighting of the first address or domain name indicating that the first address or domain name has been observed by the third source entity; and
determine the total count of sightings of the first address or domain name based on an addition of the first and second sightings of the first address or domain name.

14. The non-transitory machine-readable storage medium of claim 10, wherein the instructions are executable to cause the processor to:
obtain the first set of user feedback information regarding the first security indicator from users of the security information sharing platform, and a second set of user feedback information regarding the first security indicator from external resources that are external to the security sharing information platform;
compare the first set of user feedback information and the second set of user feedback information; and
adjust the reliability level of the first source entity based on the comparison of the first set of user feedback information and the second set of user feedback information.

15. The non-transitory machine-readable storage medium of claim 10, wherein the instructions to compare the score of the first security indicator to the at least one threshold value include instructions that cause the processor to:
compare the score of the first security indicator to a first threshold value and a second threshold value;
in response to a determination that the score of the first security indicator is below the first threshold value, continue monitoring the first security indicator;
in response to a determination that the score of the first security indicator is above the first threshold value but below the second threshold value, generate a recommendation to perform a further investigation on the first security indicator; and
in response to a determination that the score of the first security indicator is above the second threshold value, determine that the first security indicator is the actual security threat.

16. The non-transitory machine-readable storage medium of claim 10, wherein the instructions are executable to cause the processor to:
in response to the determination that the first security indicator is the actual security threat, block any event that matches the first security indicator.

17. A system for source entities of security indicators comprising:

a processor; and a memory storing instructions that are executable to cause the processor to:
- identify a security indicator that is originated from a first source entity of a plurality of source entities in a security information sharing platform, wherein the security indicator provides a warning of a potential security threat and specifies a particular address or domain name of the potential security threat;
- determine a total count of sightings of the particular address or domain name of the potential security threat as observed by the plurality of source entities in the security information sharing platform;
- determine a reliability level of the first source entity based on a set of user feedback information including votes about accuracy of the security indicator and the total count of sightings of the particular address or domain name of the potential security threat,
- wherein a higher number of votes about the accuracy of the security indicator and a higher count of sightings of the particular address or domain name of the potential security threat result in a higher reliability level of the first source entity;
- determine a score of the security indicator based on the reliability level of the first source entity; and
- compare the score of the security indicator to at least one threshold value to determine whether the security indicator is an actual security threat.

18. The system of claim 17, wherein the instructions are executable to cause the processor to:
- determine an authenticity level of the first source entity based on a type of the first source entity; and
- determine the score of the security indicator based on the reliability level of the first source entity and the authenticity level of the first source entity.

19. The system of claim 17, wherein the instructions are executable to cause the processor to:
- in response to the determination that the security indicator is the actual security threat, block any event that matches the security indicator.

20. The system of claim 17, wherein the instructions to compare the score of the security indicator to the at least one threshold value include instructions that cause the processor to:
- compare the score of the security indicator to a first threshold value and a second threshold value:
- in response to a determination that the score of the security indicator is below the first threshold value, continue monitoring the security indicator;
- in response to a determination that the score of the security indicator is above the first threshold value but below the second threshold value, generate a recommendation to perform a further investigation on the security indicator; and
- in response to a determination that the score of the security indicator is above the second threshold value, determine that the security indicator is the actual security threat.

* * * * *